(12) United States Patent
Takahata

(10) Patent No.: US 9,960,449 B2
(45) Date of Patent: May 1, 2018

(54) NON-AQUEOUS ELECTROLYTE SECONDARY BATTERY INCLUDING TUNGSTEN

(71) Applicant: TOYOTA JIDOSHA KABUSHIKI KAISHA, Toyota-shi, Aichi (JP)

(72) Inventor: Koji Takahata, Nisshin (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 58 days.

(21) Appl. No.: 14/975,946

(22) Filed: Dec. 21, 2015

(65) Prior Publication Data

US 2016/0190595 A1    Jun. 30, 2016

(30) Foreign Application Priority Data

Dec. 26, 2014    (JP) .................. 2014-266675

(51) Int. Cl.
| | |
|---|---|
| *H01M 4/62* | (2006.01) |
| *H01M 10/0568* | (2010.01) |
| *H01M 4/485* | (2010.01) |
| *H01M 4/525* | (2010.01) |
| *H01M 4/505* | (2010.01) |
| *H01M 10/052* | (2010.01) |

(Continued)

(52) U.S. Cl.
CPC ....... *H01M 10/0568* (2013.01); *H01M 4/485* (2013.01); *H01M 4/505* (2013.01); *H01M 4/525* (2013.01); *H01M 10/052* (2013.01); *H01M 10/446* (2013.01); *H01M 4/366* (2013.01); *Y02T 10/7011* (2013.01)

(58) Field of Classification Search
CPC combination set(s) only.
See application file for complete search history.

(56) References Cited

U.S. PATENT DOCUMENTS

| | | | |
|---|---|---|---|
| 6,203,944 B1 * | 3/2001 | Turner ................. | H01M 4/134 |
| | | | 252/182.1 |
| 9,130,212 B1 * | 9/2015 | Kokado ................ | B82Y 30/00 |

(Continued)

FOREIGN PATENT DOCUMENTS

| | | |
|---|---|---|
| JP | 2012-243477 A | 12/2012 |
| JP | 2013-89445 A | 5/2013 |

(Continued)

*Primary Examiner* — Imran Akram
(74) *Attorney, Agent, or Firm* — Sughrue Mion, PLLC

(57) ABSTRACT

Provided is a non-aqueous electrolyte secondary battery with reduced resistance in a low SOC range, with the battery having a coating on its negative electrode active material. This invention provides a non-aqueous electrolyte secondary battery comprising a positive electrode that has a positive electrode active material layer comprising a positive electrode active material, a negative electrode that has a negative electrode active material layer comprising a negative electrode active material, and a non-aqueous electrolyte. The negative electrode active material has a coating. The coating comprises an oxalato complex-derived component and an N-methyl-2-pyrrolidone-derived component. The non-aqueous electrolyte secondary battery internally comprises tungsten. The tungsten content per unit capacity of the non-aqueous electrolyte secondary battery is 0.0048 g/Ah to 0.0078 g/Ah.

10 Claims, 2 Drawing Sheets

(51) Int. Cl.
*H01M 10/44* (2006.01)
*H01M 4/36* (2006.01)

(56) References Cited

U.S. PATENT DOCUMENTS

| | | | | |
|---|---|---|---|---|
| 2012/0219907 A1* | 8/2012 | Ichikawa | ................ | G03F 7/027 |
| | | | | 430/281.1 |
| 2013/0260262 A1* | 10/2013 | Miyazaki | .............. | H01M 4/131 |
| | | | | 429/332 |
| 2014/0205901 A1* | 7/2014 | Nagai | .................... | C01G 53/50 |
| | | | | 429/211 |
| 2014/0308578 A1 | 10/2014 | Onizuka et al. | | |
| 2014/0329146 A1* | 11/2014 | Niina | .................... | H01M 4/505 |
| | | | | 429/223 |
| 2015/0207147 A1 | 7/2015 | Nagai et al. | | |
| 2015/0214542 A1* | 7/2015 | Kawakita | .............. | H01M 4/366 |
| | | | | 429/231.5 |
| 2015/0221933 A1* | 8/2015 | Mizawa | ................ | H01M 4/525 |
| | | | | 429/223 |
| 2016/0006029 A1* | 1/2016 | Sugaya | ................ | H01M 4/485 |
| | | | | 429/223 |

FOREIGN PATENT DOCUMENTS

| | | | | |
|---|---|---|---|---|
| JP | 2014-032777 A | 2/2014 | | |
| JP | 2016-126908 A | 7/2016 | | |
| WO | 2014/002611 A1 | 1/2014 | | |
| WO | WO 2014156054 A1 * | 10/2014 | ............ | H01M 4/485 |
| WO | 2016/103023 A1 | 6/2016 | | |

\* cited by examiner

NON-AQUEOUS ELECTROLYTE SECONDARY BATTERY INCLUDING TUNGSTEN

TECHNICAL FIELD

The present invention relates to a non-aqueous electrolyte secondary battery. In particular, it relates to a non-aqueous electrolyte secondary battery having a coating on its negative electrode active material.

The present application claims priority to Japanese Patent Application No. 2014-266675 filed on Dec. 26, 2014; and the entire contents of which are incorporated herein by reference.

BACKGROUND ART

In a non-aqueous electrolyte secondary battery such as a lithium-ion battery, a coating agent may be included for a purpose of increasing the durability, etc. In such a battery, typically during the initial charging, the coating agent undergoes electrical decomposition (typically reductive decomposition). A stable coating is then formed on the surface of the negative electrode active material. This can inhibit decomposition of the non-aqueous electrolyte when the battery is in use and thereby increase the durability of the battery.

As a conventional technical literature related to this, Patent Document 1 can be cited. Patent Document 1 discloses the use of an oxalato complex as a coating agent.

CITATION LIST

[Patent Literature]
[Patent Document 1] Japanese Patent Application Publication No. 2013-089445

SUMMARY OF INVENTION

In view of the durability over a long period of time, for instance about 10 years, however, there is still some room for improvement in the art of Patent Document 1. Thus, upon earnest examination, the present inventor has made a non-aqueous electrolyte secondary battery having increased long-term durability. In particular, the non-aqueous electrolyte secondary battery has been made, comprising a positive electrode that has a positive electrode active material layer comprising a positive electrode active material, a negative electrode that has a negative electrode active material layer comprising a negative electrode active material, a non-aqueous electrolyte, wherein the negative electrode active material has a coating comprising an oxalato complex-derived component and an N-methyl-2-pyrrolidone-derived component.

As a result of further assessment and examination on the battery by the present inventor, it has been found that the inclusion of the coating on the negative electrode active material comes with a trade-off of increased internal resistance at low SOC (state of charge). Accordingly, the present inventor has thought that the resistance needs to be further reduced for applying the art to a battery used in an embodiment where rapid charging and discharging are repeated in a low SOC range (e.g. in a SOC range at or below 25%), such as a battery installed in a plug-in hybrid automobile.

The present invention has been made in view of these circumstances. An objective thereof is to provide a non-aqueous electrolyte secondary battery with reduced resistance in a low SOC range, having a coating on its negative electrode active material.

The present invention provides a non-aqueous electrolyte secondary battery having a positive electrode that has a positive electrode active material layer comprising a positive electrode active material, a negative electrode that has a negative electrode active material layer comprising a negative electrode active material, and a non-aqueous electrolyte. The negative electrode active material has a coating. The coating comprises an oxalato complex-derived component and an N-methyl-2-pyrrolidone-derived component. The non-aqueous electrolyte secondary battery internally comprises tungsten. The tungsten content per unit capacity is 0.0048 g/Ah or greater, but 0.0078 g/Ah or less.

In such a battery, in the presence of the composite coating comprising the two kinds of components in the negative electrode active material, decomposition of the non-aqueous electrolyte can be reduced to a great extent. The prescribed tungsten content in the battery can also bring about reductions in resistance in a low SOC range as compared with a tungsten-free counterpart. As a result, excellent input/output performance can be produced in a low SOC range.

In a preferable embodiment of the non-aqueous electrolyte secondary battery disclosed herein, the positive electrode active material layer comprises N-methyl-2-pyrrolidone (or NMP hereinafter). This can bring about greater durability (e.g. high-temperature storage stability).

In this description "comprising N-methyl-2-pyrrolidone" means that N-methyl-2-pyrrolidone has been purposely included during the battery preparation. For instance, it indicates that in forming the positive electrode active material layer, some N-methyl-2-pyrrolidone used as the solvent is intentionally (readily) allowed to remain in the positive electrode active material layer. More specifically, it indicates that the N-methyl-2-pyrrolidone content A per unit mass of positive electrode active material is 5 ppm or greater, preferably 10 ppm or greater, more preferably 20 ppm or greater, for instance, 50 ppm or greater, or even 100 ppm or greater.

In a preferable embodiment of the non-aqueous electrolyte secondary battery disclosed herein, the positive electrode active material has a DBP oil absorption of 32 ml/100 g or greater, but 43 ml/100 g or less. This can reduce the resistance in a low SOC range to a great extent. Thus, the effect of this invention can be produced to a greater extent.

In a preferable embodiment of the non-aqueous electrolyte secondary battery disclosed herein, the positive electrode active material comprises a lithium composite oxide that has, as constituent elements, lithium, nickel, cobalt, manganese and tungsten. The inclusion of tungsten as a constituent element of a positive electrode active material has an effect to reduce the resistance of the positive electrode active material. Thus, the effect of this invention can be produced to a greater extent.

In a preferable embodiment of the non-aqueous electrolyte secondary battery disclosed herein, the non-aqueous electrolyte comprises, as an oxalato complex, at least either lithium bis(oxalato)borate (LiBOB) or lithium difluorobis(oxalato)phosphate (LPFO). By this, even in the occurrence of unexpected cracking of the negative electrode active material or peeling of the negative electrode active material layer when the battery is in use, a new coating can be formed on the exposed surface of the negative electrode active material. Accordingly, greater durability can be obtained.

DESCRIPTION OF EMBODIMENTS

Figure 1:
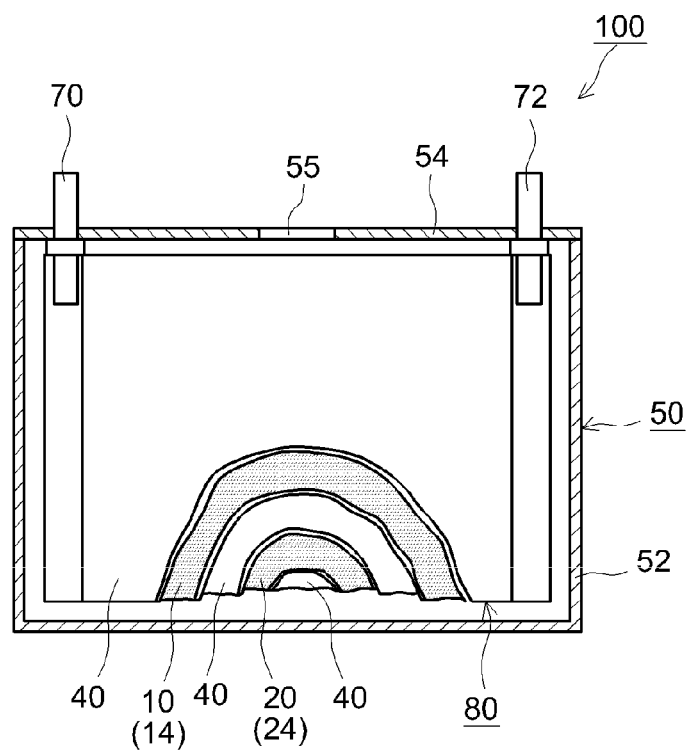
FIG. 1 shows a schematic diagram illustrating a cross section of the non-aqueous electrolyte secondary battery according to an embodiment of the present invention.

Preferred embodiments of the present invention are described below. Matters necessary to practice this invention other than those specifically referred to in this description may be understood as design matters for a person ordinarily skilled in the art based on the conventional art in the pertinent field. The present invention can be practiced based on the contents disclosed in this description and common technical knowledge in the subject field.

<Non-Aqueous Electrolyte Secondary Battery>

The non-aqueous electrolyte secondary battery disclosed herein has (a) a positive electrode, (b) a negative electrode and (c) a non-aqueous electrolyte. Typically, in addition to the (a) to (c), it comprises (d) an insulating layer (separator) that provides insulation between the positive electrode and the negative electrode.

<Tungsten Content in Battery>

The non-aqueous electrolyte secondary battery disclosed herein has a tungsten content per unit capacity of 0.0048 g/Ah or greater, but 0.0078 g/Ah or less.

When the tungsten content is 0.0048 g/Ah or greater (e.g. 0.005 g/Ah or greater), the effect of this invention (the resistance-reducing effect in a low SOC range) can be produced to a greater extent.

When the tungsten content is 0.0078 g/Ah or less (e.g. 0.007 g/Ah or less, preferably 0.0067 g/Ah or less), charge-carrying ions are smoothly transported during charging and discharging. In other words, the presence of tungsten in the battery can reduce the impeded transport of charge-carrying ions. For instance, it facilitates storing of charge-carrying ions into the active material(s) and releasing of charge-carrying ions from the active material(s). Thus, the input/output performance can be increased.

Tungsten can be present anywhere inside the battery. In a typical embodiment, it is present in a region in contact with the non-aqueous electrolyte. For instance, it can be present in/on at least one battery component among the (a) to (d).

The form of tungsten in the battery is not particularly limited, either. For instance, it may be included as a component of an active material (e.g. positive electrode active material); or may be included as an additive in a form of a tungsten oxide ($WO_2$, $WO_3$), tungsten sulfide ($WS_2$), tungsten nitride ($WN_2$), etc., in an active material layer. In an embodiment where it is included in the non-aqueous electrolyte, it can be in a form of tungsten ions or a tungsten complex.

In this description, the term "tungsten content per unit capacity" refers to the quotient of the total mass (g) of tungsten in a non-aqueous electrolyte secondary battery divided by the initial battery capacity (Ah).

The total mass (g) of tungsten in a non-aqueous electrolyte secondary battery is determined by adding the masses (g) of tungsten in the respective components (typically in the (a) to (d)). The tungsten content in each component can be measured, for instance, by heretofore known ICP (inductively coupled plasma) analysis.

The initial battery capacity (Ah) can be determined from an initial charge and discharge test after the battery is constructed. In particular, a battery is first constructed by general procedures. Subsequently, in an environment at a temperature of 25° C., the battery is charged (CC-charged) at a constant current of ⅓ C until the voltage across the positive and negative terminals reaches 4.1 V followed by a 10 minute break. The battery is then discharged (CC-discharged) at a constant current of ⅓ C until the voltage across the positive and negative terminals reaches 3.0 V followed by discharging (CV-discharging) at the constant voltage for a total discharge time of 1.5 hours. The CCCV discharge capacity (integrated capacity) during this is used as the initial battery capacity (Ah).

<(a) Positive Electrode>

The positive electrode comprises a positive electrode active material layer. The positive electrode typically comprises a positive current collector and a positive electrode active material layer secured on the positive current collector. The positive electrode active material layer comprises a positive electrode active material.

As the positive current collector, a conductive material formed of a highly conductive metal (e.g. aluminum, nickel, etc.) is preferable.

As the positive electrode active material, one, two or more species of material can be suitably used among those known to be usable as positive electrode active materials for non-aqueous electrolyte secondary batteries. Preferable examples include lithium composite oxides such as $LiNiO_2$, $LiCoO_2$, $LiFeO_2$, $LiMn_2O_4$, $LiNi_{0.5}Mn_{1.5}O_4$, etc. In particular, from the standpoint of increasing the thermal stability and energy density, a lithium nickel cobalt manganese composite oxide comprising, as constituent elements, at least lithium (Li), nickel (Ni), cobalt (Co) and manganese (Mn) is preferable. Such a composite oxide has a layered structure.

In a preferable embodiment, the lithium nickel cobalt manganese composite oxide further comprises tungsten (W). In other words, as the positive electrode active material, a lithium composite oxide comprising, as constituent elements, lithium, nickel, cobalt, manganese and tungsten is preferable.

According to the studies by the present inventor, when W is partially substituted for the site of at least one transition metal species among Ni, Co and Mn, some "disorder" occurs in the layered structure. That is, the interlayer distance increases in some parts of the layered structure. This brings about smoother storing and releasing of charge-carrying ions. As a result, the resistance of the positive electrode can be reduced. Thus, greater input/output performance can be obtained in a low SOC range.

In a preferable embodiment, the lithium composite oxide comprising lithium, nickel, cobalt, manganese and tungsten is represented by the next general formula $Li_{1+\alpha}Ni_xCo_yMn_zW_\beta A_\gamma O_2$ (I).

In the general formula (I), x, y, z, β and γ are values satisfying $0.3 \leq x \leq 0.7$ (e.g. $0.3 \leq x \leq 0.5$), $0.1 \leq y \leq 0.4$ (e.g. $0.2 \leq y \leq 0.4$), $0.1 \leq z \leq 0.4$ (e.g. $0.1 \leq z \leq 0.3$), $0.0005 \leq \beta \leq 0.02$, $0 \leq \gamma \leq 0.02$ (e.g. $0.0005 \leq \gamma \leq 0.01$), and $x+y+z+\beta+\gamma \approx 1$ (e.g. $x+y+z+\beta+\gamma = 0.9$ to $1.1$, typically $x+y+z+\beta+\gamma = 1$); and a is a value that satisfies $-0.05 \leq \alpha \leq 0.2$ (e.g. $0 \leq \alpha \leq 0.2$) while maintaining electrical neutrality. When γ<0, A is one, two or more species of element selected from a group consisting of sodium (Na), magnesium (Mg), aluminum (Al), calcium (Ca), titanium (Ti), iron (Fe), vanadium (V), chromium (Cr), zirconium (Zr), niobium (Nb), molybdenum (Mo), hafnium (Hf) and tantalum (Ta). Among them, Zr is preferably included.

While the compositional ratio shown for oxygen (O) is 2 in the general formula (I), this value should not be considered exact. Some variations in the compositional ratio (e.g. being in a range of 1.95 to 2.05) are acceptable.

The characteristics of the positive electrode active material are not particularly limited. It is typically in a particulate form. The positive electrode active material has an average particle diameter of usually about 0.5 μm to 20 μm, typically about 1 μm to 15 μm, for example, about 5 μm to 10 μm. In this description, the term "average particle diameter" refers to the particle diameter at the 50th percentile ($D_{50}$ particle diameter) (from the small diameter side) of the size distribution by volume based on a general laser diffraction/light scattering method.

In a preferable embodiment, the positive electrode active material has a DBP oil absorption of 20 mL/100 g or higher, for instance, 25 mL/100 g or higher, in particular 32 mL/100 g or higher. This can increase the compatibility with the non-aqueous electrolyte and further reduce its resistance at the interface with the non-aqueous electrolyte. Thus, in a low SOC range, greater input/output performance can be produced.

In another preferable embodiment, the positive electrode active material has a DBP oil absorption of 50 mL/100 g or lower, for instance, 47 mL/100 g or lower, in particular 43 mL/100 g or lower. When positive electrode active material layers have the same porosity, the higher the oil absorption of the positive electrode active material is, the larger the voids are within the positive electrode active material (within the secondary particles), leading to a tendency to smaller spaces among the secondary particles. With the DBP oil absorption satisfying the upper limit, preferable voids can be suitably ensured within the positive electrode active material layer (among the secondary particles). As a result, charge-carrying ions are transported more smoothly and the reaction resistance can be further reduced during charging and discharging.

In this description, the "DBP oil absorption" refers to the value measured using DBP (dibutyl phthalate) as the test liquid, based on JIS K6217-4 (2008).

One example of the positive electrode active material that satisfies the DBP oil absorption range is in a form of hollow particles having a shell with an empty space formed therein. Hollow particles can store the non-aqueous electrolyte in the empty space. Thus, it is compatible with the non-aqueous electrolyte and is preferable from the standpoint of achieving low resistance in a low SOC range. In addition, even when rapid charging and discharging are repeated, there is an advantage that the positive electrode active material layer is less likely to "dry up." A compound having such a hollow structure can be purchased as a commercial product or produced by a heretofore known method.

The shell of the hollow particles is constituted with an aforementioned positive electrode active material (e.g. a lithium composite oxide). The shell is typically in a form of a spherical assembly of primary particles. In a preferable embodiment, the shell has a ring form (bead bracelet form) made of linked primary particles in a cross-sectional image observed with an electron microscope (e.g. SEM (scanning electron microscope)).

The empty space in a hollow particle preferably accounts for 5% or greater of the apparent total cross-sectional area of the particle in an observed image of a cross section cut at an arbitrary position in the particle. In a preferable embodiment, the ratio of empty space to total hollow particle area is generally 20% or higher, typically 30% or higher, for instance, 40% or higher. By this, the aforementioned resistance-reducing effect can be produced to a greater extent. The ratio of empty space to total hollow particle area can be generally 85% or lower, typically 80% or lower, for instance, 70% or lower. This can increase the mechanical durability of the hollow particles and the positive electrode active material layer comprising the hollow particles.

For instance, the ratio of empty space to total hollow particle area can be assessed as follows: First, an object of measurement (e.g. a positive electrode active material layer) comprising the hollow particles is embedded in a suitable resin and sliced (or polished) to expose cross sections of the hollow particles. The cross sections are then observed under an electron microscope. In the observed images, the shell areas and empty space areas are sorted according to differences in color or shade. The apparent total cross-sectional area $S_T$ of the hollow particles and the cross-sectional area $S_h$ of empty space are determined. From their areal ratio ($S_h/S_T$), the ratio (%) of empty space can be determined.

The positive electrode active material layer may comprise other optional components (e.g. a binder, conductive material, etc.) in addition to the positive electrode active material. As the binder, for example, a halogenated vinyl resin such as polyvinylidene fluoride (PVdF) or a polyalkylene oxide such as polyethylene oxide (PEO) can be preferably used. As the conductive material, for example, a carbon material such as carbon black including acetylene black and ketjen black, activated carbon, graphite, carbon fiber, and the like can be preferably used.

In a preferable embodiment, the positive electrode active material layer comprises NMP. The NMP content A per unit mass of positive electrode active material layer can be 5 ppm or greater, preferably 10 ppm or greater, more preferably 20 ppm or greater, for instance, 50 ppm or greater, or even 100 ppm or greater. In another preferable embodiment, A can be 350 ppm or less, preferably 300 ppm or less, more preferably 250 ppm or less, for instance, 200 ppm or less, such as 150 ppm or less. This can bring about greater durability (e.g. high-temperature storage stability). Thus, durability and great input/output performance can be combined at a high level.

The NMP content in a positive electrode active material layer can be determined as follows. For instance, the positive electrode active material layer is cut into a piece of prescribed dimensions to obtain a measurement sample. The measurement sample is then immersed in a suitable solvent (e.g. acetone) to extract NMP into the solvent. The extract is quantitatively analyzed by GC-MS (gas chromatography-mass spectrometry). The resulting quantitative value (g) is divided by the mass (non-volatile content in g) of the positive electrode active material layer subjected to the measurement. By this, the NMP content (ppm) per unit mass of positive electrode active material can be determined.

The positive electrode may or may not comprise tungsten.

In a preferable embodiment, the positive electrode active material layer comprises tungsten. Typically, the positive electrode active material comprises tungsten as a constituent element. The tungsten content in the positive electrode is not particularly limited. For instance, with the total tungsten content in the battery being 100%, the tungsten content in the positive electrode can be generally 50% or greater, typically 70% or greater, for instance, 90% or greater. This may effectively reduce the interface resistance between the positive electrode and non-aqueous electrolyte. As a result, the effect of this invention can be produced to a greater extent, further reducing the resistance in a low SOC range.

In another preferable embodiment, tungsten is included nearly homogeneously throughout the entire thickness of the positive electrode active material. By this, the effect of this invention can be produced more stably.

<(b) Negative Electrode>

The negative electrode comprises a negative electrode active material layer. The negative electrode typically comprises a negative current collector and a negative electrode active material layer secured on the negative current collector. The negative electrode active material layer comprises a negative electrode active material.

As the negative current collector, a conductive material formed of a highly conductive metal (e.g. copper, nickel, etc.) is preferable.

As the negative electrode active material, one, two or more species of material can be suitably used among those known to be usable as negative electrode active materials for non-aqueous electrolyte secondary battery. Preferable examples include graphite, hard-to-graphitize carbon (hard carbon), easy-to-graphitize carbon (soft carbon), a carbon material having a structure combining these (e.g. amorphous carbon-coated graphite) and the like. In particular, from the standpoint of the energy density, a graphitic material whose graphite content accounts for 50% or greater of its total mass can be preferably used. In general, a graphitic material is highly crystalline and includes well-developed highly reactive areas called edge faces. Thus, it sometimes accelerates decomposition of the non-aqueous electrolyte. Accordingly, the present invention is particularly effective.

In the art disclosed herein, the negative electrode active material has a coating. The coating comprises an oxalato complex-derived component and an NMP-derived component. That is, the coating on the negative electrode active material may comprise, as the oxalato complex-derived component, for instance, lithium ions (Li+), oxalate ions ($C_2O_4^{-2}$), boron (B) and/or phosphorous (P). For example, when LiBOB is used as the oxalato complex when constructing the battery, the coating may comprise species such as tricoordinate boron ($B^{3+}$), $Li^+$, $B(C_2O_4)+$, $C_2O_4^{2-}$, $COO^-$, etc. The coating on the negative electrode active material may comprise, as the NMP-derived component, for instance, a carbonyl group ($C(=O)^-$) and nitrogen atom (N).

Such a coating stabilizes the surface of the negative electrode active material (typically a graphitic material). By this, for instance, even when charge/discharge cycles are repeated over a long period of time or when the battery is exposed to a harsh environment such as a high temperature, etc., reductive decomposition of the non-aqueous electrolyte can be reduced to a great extent. As a result, excellent long-term durability can be obtained.

The durability-increasing effect can be attained by the inclusion of the two components (an oxalato complex-derived component and an NMP-derived component) in the coating. Thus, for instance, the effect of this invention cannot be obtained just by including a component derived only from either the oxalato complex or NMP. On the contrary, the durability may even deteriorate.

The presence of the two components in a coating on a negative electrode active material can be detected, for instance, by subjecting the surface of the negative electrode active material to coating analysis. In particular, first, in an inert gas atmosphere, the battery is disassembled and the negative electrode is collected. The negative electrode is washed with a suitable solvent (e.g. EMC) and cut into a piece of a suitable size to obtain a measurement sample. Subsequently, coating components in the surface are extracted with a suitable solvent. The extract is then subjected to analysis by a method such as GC-MS, LC-MS (liquid chromatography-mass spectrometry), IC (ion chromatography), XAFS (x-ray absorption fine structure), ICP-AES (inductively coupled plasma-atomic emission spectrometry), and so on. Among these analytical methods, a suitable method can be selected in accordance with the elements being analyzed, etc. The presence of the two components can be detected by qualitative and quantitative analysis of chemical species from decomposition products of an oxalato complex and NMP.

The negative electrode active material layer may comprise other optional components (e.g. a binder, thickener, etc.) in addition to the negative electrode active material. As the binder, for instance, rubbers such as styrene-butadiene rubber (SBR) as well as polytetrafluoroethylene (PTFE), etc., can be preferably used. As the thickener, for instance, celluloses such as carboxymethyl cellulose (CMC), methyl cellulose (MC), etc., can be preferably used. In addition, various other additives (e.g. dispersing agent, conductive material, etc.) can be also used as far as the effect of this invention is not significantly impaired.

The negative electrode may or may not comprise tungsten.

In a preferable embodiment, the negative electrode active material layer comprises tungsten. Since tungsten is a metal, for instance, even if it is included in another component (e.g. the positive electrode active material layer, etc.) than in the negative electrode at the time of the battery's construction, application of a voltage to the battery may electrically attract tungsten to the negative electrode. Thus, in a preferable example, there may be localized presence (precipitation) of tungsten on the surface of the thickness of the negative electrode active material layer.

According to the studies by the present inventor, the inclusion of tungsten in the negative electrode is thought to have an effect to modify the coating. While its mechanism is not known, for instance, it is thought that tungsten serves as some sort of catalyst to partially decompose the composite coating comprising the two components (an oxalato complex-derived component and an NMP-derived component) described above. As a result, the composite coating can be modified into a good quality coating combining high durability and low resistance. This effect can be produced to a greater extent when the presence of tungsten is localized on the surface of the negative electrode active material layer. As described above, the inclusion of tungsten in the negative electrode active material layer can further reduce the resistance in a low SOC range.

<(c) Non-Aqueous Electrolyte>

The non-aqueous electrolyte is typically in a liquid state at room temperature (e.g. 25° C.). In other words, it is a non-aqueous electrolyte solution. Preferably, it is always in the liquid state in the use temperature range (e.g. −30° C. to +60° C.). For the non-aqueous electrolyte, a non-aqueous solvent containing a supporting salt can be preferably used. As the supporting salt, one, two or more species can be used among various compounds known to be usable as supporting salts for non-aqueous secondary batteries. Preferable examples include lithium salts such as $LiPF_6$, $LiBF_4$, $LiClO_4$, etc. In particular, $LiPF_6$ is preferable. As the non-aqueous solvent, various organic solvents used for non-aqueous electrolytes in general non-aqueous electrolyte secondary batteries can be used. Specific examples include carbonates, ethers, esters, nitriles, sulfones, lactones, etc. Preferable examples include carbonates such as ethylene carbonate (EC), propylene carbonate (PC), diethyl carbonate (DEC), dimethyl carbonate (DMC), ethyl methyl carbonate (EMC), and the like.

In a preferable embodiment, the non-aqueous electrolyte comprises an oxalato complex (possibly in a form of an oxalato complex ion, etc.). This allows formation of a new coating even when the battery is in use. In other words, even in the occurrence of unexpected cracking of the negative electrode active material or peeling of the negative electrode active material layer caused by repeated charge and discharge cycles, etc., a new coating can be formed on the exposed surface of the negative electrode (negative electrode active material). Thus, greater durability can be obtained.

For the oxalato complex, species prepared by various known methods as well as various generally available products, etc., can be considered.

The oxalato complex is formed with at least one oxalate ion ($C_2O_4^{2-}$) coordinating a central atom. Examples of the central atom include metalloids such as boron (B) and phosphorous (P), etc. Specific examples include (i) a compound having a tetracoordinate structure where a boron (B) as the central atom is coordinated with at least one oxalate ion ($C_2O_4^{2-}$); (ii) a compound having a hexacoordinate structure where a phosphorous (P) as the central atom is coordinated with at least one oxalate ion ($C_2O_4^{2-}$); and the like. Among them, a compound comprising the same cation species (charge carrier ion) as the supporting salt is especially preferable.

Preferable examples of the compound (i) include lithium bis(oxalato)borate ($Li[B(C_2O_4)_2]$, LiBOB), lithium difluoro (oxalato)borate ($Li[BF_2(C_2O_4)]$) and the like. Preferable examples of the compound (ii) include lithium bis(oxalato) phosphate ($Li[P(C_2O_4)_3]$), lithium difluorobis(oxalato) phosphate ($Li[PF_2(C_2O_4)_2]$, LPFO), lithium tetrafluoro(oxalato)phosphate ($Li[PF_4(C_2O_4)]$), etc. In particular, from the standpoint of forming a coating having excellent high-temperature endurance, LiBOB and LPFO are preferable. LiBOB is particularly preferable.

The non-aqueous electrolyte may further comprise various types of additives as far as the effect of this invention is not significantly impaired. Such additives may be used for one, two or more purposes of, for instance, increasing the cycle characteristics of the battery, increasing the high-temperature storage stability, increasing the initial charge/discharge efficiency, increasing the input/output performance, increasing the overcharge endurance (increasing the amount of gas formed upon overcharge), and so on. Specific examples include vinylene carbonate (VC), vinyl ethylene carbonate (VEC), biphenyl (BP), cyclohexylbenzene (CHB), and the like.

The non-aqueous electrolyte may or may not comprise tungsten. For instance, it may be present in a form of tungsten ions or a tungsten complex dissolved in the non-aqueous solvent. The non-aqueous electrolyte is in contact with the negative electrode active material layer. Thus, the tungsten content in the non-aqueous electrolyte can produce the aforementioned coating-modifying effect to a greater extent.

<(d) Insulating Layer (Separator)>

As the insulating layer (separator), the same kinds as for general non-aqueous electrolyte secondary batteries can be used. Possible examples include a porous sheet or non-woven fabric formed of a resin such as polyethylene (PE), polypropylene (PP), polyester, cellulose, polyamide, etc. The porous sheet may comprise, on a surface thereof, a porous heat-resistant layer comprising particles of an inorganic compound (inorganic filler) for a purpose of preventing an internal short circuit, etc.

The insulating layer may or may not comprise tungsten. For instance, in an embodiment where tungsten included in the positive electrode (e.g. the positive electrode active material layer), etc., during the battery's construction moves via the non-aqueous electrolyte to the negative electrode, there may be localized presence (precipitation) of tungsten on the negative electrode-side surface of the insulating layer.

<Method for Producing Non-Aqueous Electrolyte Secondary Battery>

As a preferable example, the non-aqueous electrolyte secondary battery disclosed herein can be produced by a production method generally comprising the following steps:

(S1) preparing a positive electrode active material layer-forming slurry, using N-methyl-2-pyrrolidone and a positive electrode active material that comprises tungsten as a constituent element.

(S2) obtaining a positive electrode by applying the slurry to a surface of a positive current collector to form a positive electrode active material layer;

(S3) preparing a non-aqueous electrolyte comprising an oxalato complex; and (S4) constructing a battery, using the positive electrode and the non-aqueous electrolyte.

According to such a production method, the non-aqueous electrolyte secondary battery disclosed herein can be produced more consistently and efficiently <First Embodiment of Non-Aqueous Electrolyte Secondary Battery>

Described below is an example of the non-aqueous electrolyte secondary battery (single cell) according to, but not particularly limited to, an embodiment of the present invention with suitable reference to drawings. In the drawings shown below, a common reference numeral may be assigned to members or sites producing the same effects, and duplicated descriptions are sometimes omitted or simplified. Dimensional relationships (length, width, thickness, etc.) in the respective drawings do not necessarily represent the accurate dimensional relationships.

FIG. 1 shows a longitudinal section view schematically illustrating a cross-sectional structure of a non-aqueous electrolyte secondary battery 100 according to an embodiment of the present invention. In the non-aqueous electrolyte secondary battery 100, a flat, wound electrode body 80 and a non-aqueous electrolyte not shown in the drawing are placed in a flat, box-shaped battery case 50.

Battery case 50 comprises a flat box-shaped main battery casing 52 having a top opening and further comprises a lid 54 to close the opening. The top face (i.e. lid 54) of battery case 50 comprises a positive terminal 70 for external connection to make electrical connection to the positive electrode of wound electrode body 80 and a negative terminal 72 to make electrical connection to the negative electrode of wound electrode body 80. Lid 54 also comprises a safety valve 55 to discharge the gas produced inside the battery case 50 to the outside.

In the battery case 50, flat wound electrode body 80 is contained along with a non-aqueous electrolyte not shown in the drawing. Wound electrode body 80 is formed by layering a long positive electrode sheet 10 and a long negative electrode sheet 20 and winding the layers into a flat form. Positive electrode sheet 10 comprises a length of positive current collector and a positive electrode active material layer 14 formed in the length direction on at least one face (typically each face) thereof. Negative electrode sheet 20 comprises a long length of negative current collector and a negative electrode active material layer 24 formed in the length direction on at least one face (typically each face) thereof. Between positive electrode active material layer 14 and negative electrode active material layer 24, two long sheets of separator 40 are placed as insulating layers to prevent direct contacts between the two.

In the central region in the width direction of wound electrode body 80, there is formed a wound core where the positive electrode active material layer 14 formed on the positive current collector surface and negative electrode active material layer 24 formed on the negative current collector surface are layered. The width direction is defined to extend from one end to the other end of the winding axis of wound electrode body 80. On the two ends of the winding axis of wound electrode body 80, there are margins where a portion of positive electrode sheet 10 which is free of the positive electrode active material layer and a portion of negative electrode sheet 20 which is free of the negative electrode active material layer protrude outward from the wound core, respectively. Positive current collector and negative current collector are exposed on the positive electrode-side margin and negative electrode-side margin, respectively, and are electrically connected to positive terminal 70 and negative terminal 72, respectively.

<Purposes of Non-Aqueous Electrolyte Secondary Battery>

The non-aqueous electrolyte secondary battery disclosed herein can be used for various purposes. It has excellent long-term durability by the effect of the good quality coating on the surface of the negative electrode active material. For example, it has excellent high-temperature storage stability. In addition, the inclusion of the prescribed amount of tungsten is effective in producing excellent input/output performance in a low SOC range.

Accordingly, with the benefit of these features, for instance, it can be particularly preferably used for a purpose presumably involving repeated rapid charging and discharging in a low SOC range (in a SOC range at or below 25%); a purpose for which the battery is continuously used without being replaced for a long period of time such as 10 years; a purpose for which the use environment or the storage environment may reach a temperature as high as or higher than 50° C. Examples of purposes possibly employing these embodiments include power sources for driving motors installed in vehicles such as plug-in hybrid automobiles, hybrid automobiles, electric automobiles, etc.

Accordingly, in another aspect, the present invention provides a vehicle comprising a non-aqueous electrolyte secondary battery disclosed herein. Such a non-aqueous electrolyte secondary battery can be used typically in a form of a multi-cell (battery pack) in which several cells are connected in series and/or in parallel.

Some examples related to the present invention are described below. However, the present invention is not to be limited to these specific examples.

I. Experiment Using LiBOB as Oxalato Complex

<Fabrication of Positive Electrode Active Material>

First, as positive electrode active materials, a total of 36 species of particulate lithium composite oxide were prepared, varying in tungsten content and/or oil absorption. Specifically, with respect to the lithium composite oxide represented by the next general formula $Li_{1.14}(Ni_{0.335}Co_{0.335}Mn_{0.33})_{0.993}W_\beta Zr_{0.002} O_2$, were prepared 36 species of lithium composite oxide with different β values (tungsten contents) and/or oil absorptions.

First, were dissolved, in water, nickel sulfate ($NiSO_4$) as a Ni source, cobalt sulfate ($CoSO_4$) as a cobalt source and manganese sulfate ($MnSO_4$) as a Mn source to prepare an aqueous solution containing Ni, Co and Mn. Under basic conditions, from the aqueous solution, a composite hydroxide (transition metal hydroxide) was precipitated. Herein, by adjusting the basic atmosphere (pH) to six different levels, the particle diameters of transition metal hydroxides were adjusted.

Were dissolved, in water, ammonium paratungstate $(5(NH_4)_2O \cdot 12WO_3)$ as a W source and zirconium nitrate as a Zr source to prepare an aqueous solution B containing W and Zr. Under basic conditions, were mixed the six different transition metal hydroxides of different particle diameters and the aqueous solution B at six different molar ratios, respectively. By this, were obtained a total of 36 different composite hydroxides (precursor hydroxides) containing Ni, Co, Mn, W and Zr.

The precursor hydroxides were mixed respectively with lithium carbonate ($Li_2CO_3$) as a lithium source and the mixtures were calcined in the air. The resulting calcined products were cooled, crushed and sieved to obtain a total of 36 species of lithium composite oxide with different compositional ratios of tungsten (different β values) and/or average particle diameters.

These lithium composite oxides were observed by SEM and all species had hollow structures. The DBP oil absorption of these lithium composite oxides was measured and found in the range between 20 mL/100 g and 47 mL/100 g.

<Fabrication of Positive Electrode>

The lithium composite oxides prepared above as positive electrode active materials, acetylene black (AB) as a conductive material, and polyvinylidene difluoride (PVdF) as a binder were weighed in a mass ratio of these materials of lithium composite oxide:AB:PVdF=90:8:2, and mixed well with NMP, respectively to prepare slurry compositions. The compositions were applied in a band to long sheets of aluminum foil (positive current collector), respectively. The resultants were dried with heat and rolled to fabricate positive electrode sheets (C1 to C36) having a positive electrode active material layer on each face of the positive current collector.

<Measurement of NMP Content>

The resulting positive electrodes were measured for NMP content. In particular, first, from each positive electrode active material layer, three pieces were punched out with a die of 40 mm diameter. These pieces were cut into 5 mm by 5 mm squares with ceramic scissors to obtain measurement samples. The measurement samples were placed in sample tubes and 2 mL of acetone was added. The lid of each tube was tightly sealed with sealing tape. The sealed tubes were sonicated for 30 minutes. By this, NMP was extracted into the acetone. The extracts were transferred into screw vials for GC-MS while filtering then with syringe filters. Under the conditions shown below, GC-MS analysis was performed to quantify the NMP content.

Column: DB-WAXETR (available from Agilent Technologies, 30 m long, 0.25 mm inner diameter, 0.25 μm film thickness)
Vaporizing chamber temperature: 240° C.
Injection volume: 1 μL
Detection mode: SIM (selected ion monitoring) mode
Fragment ions detected: m/z 99

Each resulting quantitative value (g) was divided by the mass (g) of the analyzed sample to determine the NMP content $A_0$ (ppm) per unit mass of positive electrode active material. As a result, the NMP content was approximately 350 ppm in all positive electrode sheets.

<Fabrication of Negative Electrode>

A negative electrode was then fabricated. In particular, first, as a negative electrode active material, particulate graphite (C) was obtained. The particulate negative electrode active material has an average particle diameter of 10 μm and a specific surface area of about 4 m²/g.

The particulate graphite (C), styrene-butadiene rubber (SBR) as a binder, and carboxymethyl cellulose (CMC) as a thickener were weighed in a mass ratio of these materials C:SBR:CMC=98:1:1, and mixed well with ion-exchanged water to prepare a slurry composition. The composition was applied in a band to a long sheet of copper foil (negative current collector). The resultant was dried with heat and then rolled to fabricate a negative electrode sheet having a negative electrode active material layer on each face of the negative current collector.

<Preparation of Non-Aqueous Electrolyte Solution>

A non-aqueous electrolyte solution was then prepared. In particular, a solvent mixture was first prepared, containing ethylene carbonate (EC), dimethyl carbonate (DMC) and ethyl methyl carbonate (EMC) at a volume ratio EC:DMC:EMC=3:4:3. To the solvent mixture, $LiPF_6$ as a supporting salt was dissolved to a concentration of 1.1 mol/L and then lithium bis(oxalato)borate (LiBOB) as an oxalato complex was dissolved to a concentration per unit mass of negative electrode active material of 0.0396 mol/kg to obtain a non-aqueous electrolyte solution.

<Battery Construction>

The fabricated positive electrode sheets (C1 to C36) were layered respectively via a separator sheet on a negative electrode sheet to fabricate 36 different electrode bodies corresponding to the positive electrode sheets C1 to C36. As the separator sheet, was used a three-layer porous resin sheet having a polypropylene (PP) layer layered on each face of a polyethylene (PE) layer. The electrode bodies were placed in battery cases and the non-aqueous electrolyte solution was injected into the respective battery cases.

<Initial Charging>

In an environment at 25° C., the constructed batteries were provided with initial charges.

In particular, each battery was charged (CC charged) at a constant current of ⅓ C until the voltage across the positive and negative terminals reached 4.1 V followed by a 10 minute break. The battery was then discharged (CC-discharged) at a constant current of ⅓ C until the voltage across the positive and negative terminals reached 3.0 V followed by discharging (CV-discharging) at the constant voltage for a total discharge time of 1.5 hours. The charging and discharging caused formation of a coating comprising a LiBOB-derived component and an NMP-derived component on the surface of the negative electrode active material.

Non-aqueous electrolyte secondary batteries were thus constructed.

<Measurement of IV Resistance in Low SOC Range>

In an environment at a temperature of 25° C., each battery was adjusted to low SOC (25% SOC). The battery was CC-discharged at rates of ⅓ C, 1 C and 3 C respectively for 10 seconds. The relationship between the voltage drop (V) and current value (A) for this was plotted and the slope of the linear regression line was determined as the IV resistance (mΩ).

The results are shown in Table 1. Table 1 shows, as the "W (g/Ah)," the quotient of the tungsten content (g) in the positive electrode active material layer of each battery divided by its CCCV discharge capacity (initial capacity in Ah). The DBP oil absorption of positive electrode active material of each battery is also shown as the "Oil absorption (mL/100 g)."

TABLE 1

| IV resistance of batteries using LiBOB | | | | | | |
|---|---|---|---|---|---|---|
| IV Resistance | W (g/Ah) | | | | | |
| (mΩ) | 0 | 0.0025 | 0.0048 | 0.0067 | 0.0078 | 0.0093 |
| Oil absorption (mL/100 g) 20 | 45.3 | 42.3 | 37.9 | 37.3 | 37.9 | 41.4 |
| 25 | 44.6 | 42.2 | 36.8 | 36.4 | 36.3 | 40.9 |
| 32 | 43.2 | 38.7 | 32.7 | 32.1 | 33.5 | 38.6 |
| 36 | 42 | 36.6 | 30.3 | 30 | 30.3 | 37.5 |
| 43 | 40.7 | 35.7 | 28.9 | 28.2 | 28.7 | 37.8 |
| 47 | 38.8 | 37.4 | 35.7 | 35.2 | 35.4 | 38.3 |

Figure 2:
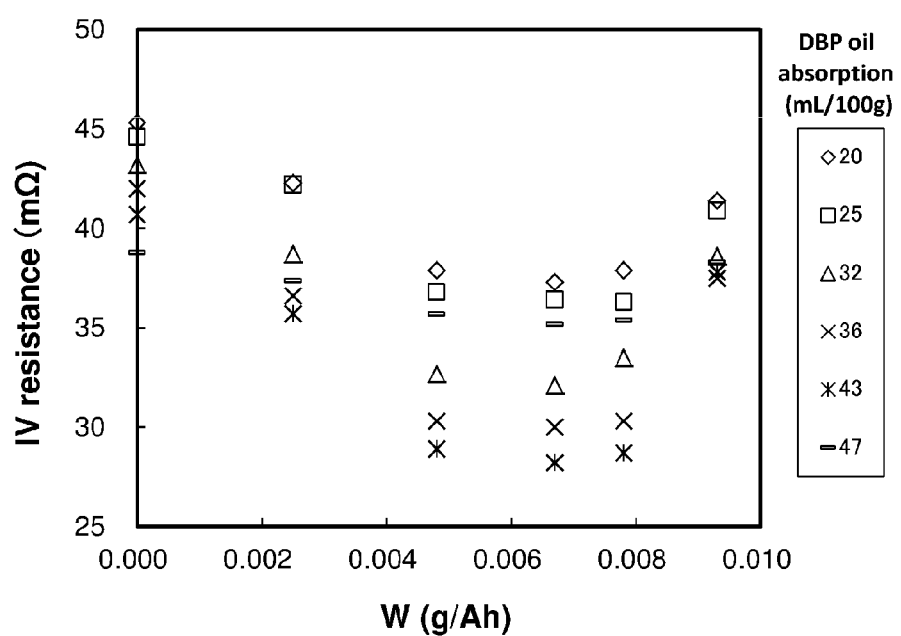
FIG. 2 shows a graph indicating the relationship between the IV resistance and tungsten content W per unit capacity.

FIG. 2 shows a graph indicating the relationship between the IV resistance (mΩ) and tungsten content per unit capacity W (g/Ah).

As shown in Table 1 and FIG. 2, when the tungsten content per initial capacity was 0.0025 g/Ah or greater, but 0.0094 g/Ah or less, the IV resistance was reduced in the low SOC range in comparison with the tungsten-free batteries (in the leftmost "W=0 g/Ah" column of Table 1). In particular, when the tungsten content per initial capacity was 0.0048 g/Ah or greater, but 0.0078 g/Ah or less, the effect of this invention was notable. For instance, it consistently brought about batteries having an IV resistance of 38 mΩ or less at 25% SOC.

Especially, when the DBP oil absorption of positive electrode active material was 32 mL/100 g or greater, but 43 mL/100 g or less, the IV resistance was further reduced. For example, it consistently brought about batteries having an IV resistance of 35 mΩ or lower at 25% SOC.

II. Experiment Using LPFO as Oxalato Complex

Herein, as the oxalato complex, lithium difluorobis(oxalato)phosphate (LPFO) was used. In particular, in preparing the non-aqueous electrolyte solution, LPFO was used in place of LiBOB. Otherwise, in the same manner as in I. above, non-aqueous electrolyte secondary batteries were constructed and subjected to battery characteristic evaluation.

The results are shown in Table 2. The symbol "—" in Table 2 indicates that no measurement was made.

TABLE 2

| IV resistance of batteries using LPFO | | | | | | |
|---|---|---|---|---|---|---|
| IV Resistance | W (g/Ah) | | | | | |
| (mΩ) | 0 | 0.0025 | 0.0048 | 0.0067 | 0.0078 | 0.0094 |
| Oil absorption (mL/100 g) 20 | — | — | — | 38.2 | — | 40.7 |
| 25 | — | — | — | 37.5 | — | 40.3 |
| 32 | — | — | — | 31.8 | — | 39.2 |
| 36 | — | — | — | 29.7 | — | 38.5 |
| 43 | — | — | — | 27.3 | — | 38.2 |
| 47 | — | — | — | 35.4 | — | 40.7 |

Figure 3:
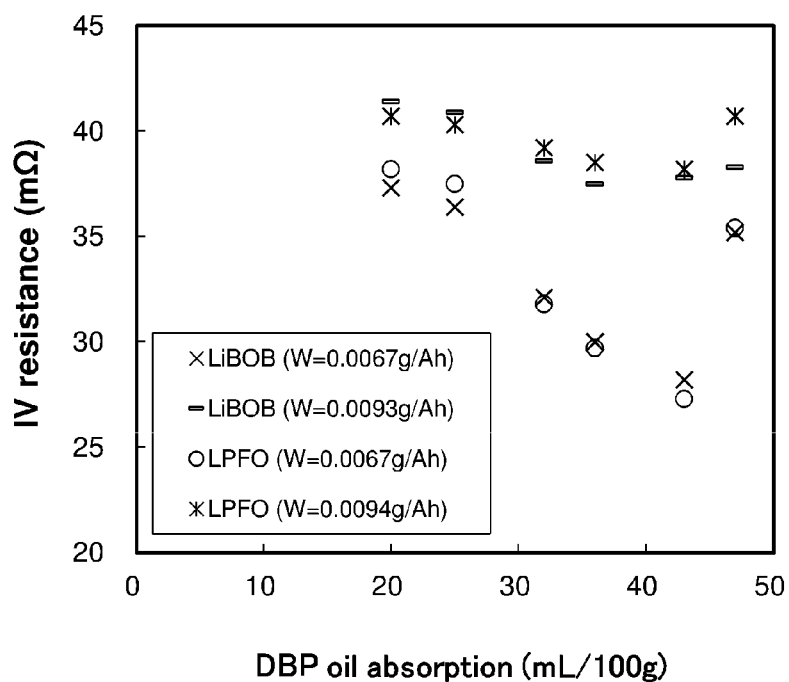
FIG. 3 shows a graph indicating the relationship between the IV resistance and DBP oil absorption.

FIG. 3 shows a graph indicating the relationship between the IV resistance (mΩ) and DBP oil absorption (mL/100 g) of positive electrode active material.

As shown in Table 2 and FIG. 3, also when LPFO was used as the oxalato complex, the results were generally equivalent to those of the batteries using LiBOB. Thus, it has been found that the art disclosed herein is not particularly limited by the types of oxalato complex. For example, no matter whether the central atom of the oxalato complex is boron (B) or phosphorous (P), a similar effect can be expected.

Although the present invention has been described in detail above, the described embodiments and working examples are merely for illustrations. The invention disclosed herein includes various modifications and changes made to the specific embodiments illustrated above.

REFERENCE SIGNS LIST 10 positive electrode sheet (positive electrode)
14 positive electrode active material layer
20 negative electrode sheet (negative electrode)
4 negative electrode active material layer
40 separator sheet (separator)
50 battery case
52 main battery casing
54 lid
55 safety valve
70 positive terminal
72 negative terminal
80 wound electrode body
100 non-aqueous electrolyte secondary battery

The invention claimed is:

1. A non-aqueous electrolyte secondary battery having
a positive electrode that has a positive electrode active material layer comprising a positive electrode active material,
a negative electrode that has a negative electrode active material layer comprising a negative electrode active material, and
a non-aqueous electrolyte, wherein
the negative electrode active material has a coating, with the coating comprising an oxalato complex-derived component and an N-methyl-2-pyrrolidone-derived component, and
the non-aqueous electrolyte secondary battery internally comprises tungsten, with the tungsten content per unit capacity being 0.0048 g/Ah or greater, but 0.0078 g/Ah or less.

2. The non-aqueous electrolyte secondary battery according to claim 1, wherein the positive electrode active material layer comprises N-methyl-2-pyrrolidone.

3. The non-aqueous electrolyte secondary battery according to claim 2, wherein the N-methyl-2-pyrrolidone in per unit mass of the positive electrode active material layer is 5 ppm or greater.

4. The non-aqueous electrolyte secondary battery according to claim 2, wherein the N-methyl-2-pyrrolidone in per unit mass of the positive electrode active material layer is 10 ppm or greater.

5. The non-aqueous electrolyte secondary battery according to claim 2, wherein the N-methyl-2-pyrrolidone in per unit mass of the positive electrode active material layer is 20 ppm or greater.

6. The non-aqueous electrolyte secondary battery according to claim 2, wherein the N-methyl-2-pyrrolidone in per unit mass of the positive electrode active material layer is 50 ppm or greater.

7. The non-aqueous electrolyte secondary battery according to claim 1, wherein the positive electrode active material has a DBP oil absorption of 32 ml/100 g or greater, but 43 ml/100 g or less.

8. The non-aqueous electrolyte secondary battery according to claim 1, wherein the positive electrode active material comprises a lithium composite oxide that has, as constituent elements, lithium, nickel, cobalt, manganese and tungsten.

9. The non-aqueous electrolyte secondary battery according to claim 1, wherein the non-aqueous electrolyte comprises, as an oxalato complex, at least either lithium bis(oxalato)borate (LiBOB) or lithium difluorobis(oxalato)phosphate (LPFO).

10. The non-aqueous electrolyte secondary battery according to claim 1, wherein the positive electrode active material is in a form of a hollow particle having a shell with an empty space formed therein.

* * * * *